United States Patent [19]

Hertel et al.

[11] 4,371,674

[45] Feb. 1, 1983

[54] WATER SOLUBLE CROSSLINKED ETHYLENEIMINE GRAFTED POLYAMIDOAMINE

[75] Inventors: Otto Hertel, Emil Scharf, Jaroslav Melzer, Rolf Fikentscher, all of 6700 Ludwigshafen, Fed. Rep. of Germany

[21] Appl. No.: 173,479

[22] Filed: Jul. 30, 1980

[30] Foreign Application Priority Data

Aug. 29, 1979 [DE] Fed. Rep. of Germany ....... 2934854

[51] Int. Cl.$^3$ ............................................. C08G 69/48
[52] U.S. Cl. .................................. 525/435; 525/420; 528/341; 528/342; 524/606
[58] Field of Search ................ 525/435, 420; 528/342, 528/341

[56] References Cited

U.S. PATENT DOCUMENTS

| | | | |
|---|---|---|---|
| 3,442,975 | 5/1969 | Cawthon et al. | 525/420 |
| 3,459,697 | 8/1969 | Goldbert et al. | 260/29.2 |
| 3,642,572 | 2/1972 | Endres et al. | 162/164 |
| 4,144,123 | 3/1979 | Scharf et al. | 162/164 R |
| 4,250,299 | 2/1981 | Lehmann et al. | 528/342 |
| 4,277,581 | 7/1981 | Vanlerberghe et al. | 528/342 |

FOREIGN PATENT DOCUMENTS 1508511 4/1978 United Kingdom .

*Primary Examiner*—Harold D. Anderson
*Attorney, Agent, or Firm*—Oblon, Fisher, Spivak, McClelland & Maier

[57] ABSTRACT

Process for the production of water-soluble auxiliaries for the papermaking industry by reacting (a) 1 part by weight of a polyamidoamine obtained by condensing 1 mole of a dicarboxylic acid having from 4 to 10 carbon atoms with from 0.8 to 1.4 moles of a polyalkylene polyamine having from 3 to 10 alkyleneamine units and containing up to 8 ethyleneimine units per basic nitrogen atom with (b) 0.1 to 4 parts by weight of an α,ω-dichloro polyalkylene oxide obtained by reacting a polyalkylene oxide having from 8 to 100 alkylene oxide units with a compound selected from the group consisting of a thionyl chloride and phosgene and then cleaving the reaction products by heating them to a temperature of from 70° to 150° C. in the presence of a tertiary amine as catalyst, as crosslinking agent, at a temperature above 20° C. in aqueous solution or in a water-soluble organic solvent, the reaction being carried out to a point at which the viscosity of an aqueous solution containing 20% by weight of auxiliary is from 300 to 2,500 mPas.

2 Claims, No Drawings

WATER SOLUBLE CROSSLINKED ETHYLENEIMINE GRAFTED POLYAMIDOAMINE

The present invention relates to a process for the preparation of nitrogen-containing condensates by reacting polyamidoamines, which have been prepared from 1 mole of a dicarboxylic acid of 4 to 10 carbon atoms and 0.8–1.4 moles of a polyalkylenepolyamine which has 3–10 basic nitrogen atoms in the molecule and may contain up to 10% by weight of a diamine, and onto which up to 8 ethyleneimine units per basic nitrogen may or may not have been grafted, with difunctional crosslinking agents at above 20° C., until a high molecular weight resin is formed which is only just water-soluble and which has a viscosity, measured in 20% strength aqueous solution at 20° C., of more than 300 mPas.

A process of this type, wherein polyalkylene oxides which contain from 8 to 100 alkylene oxide units and which have been reacted, at the terminal OH groups, with at least an equivalent amount of epichlorohydrin, are used as crosslinking agents is disclosed in German Laid-Open Application DOS No. 2,434,816. However, it has been found a disadvantage that the conventional crosslinking agent is very difficult to obtain in a pure form and always contains by-products which result from the etherification reaction of the terminal hydroxyl groups of the polyether-diol with epichlorohydrin.

It is an object of the present invention to provide a difunctional crosslinking agent, for the process referred to at the outset, which is cheaply obtainable in a pure form and which gives products which are even more effective when used as retention agents, flocculating agents and drainage accelerators in the manufacture of paper.

We have found that this object is achieved, according to the invention, if, in the process described at the outset, 1 part by weight of one of the stated polyamidoamines is reacted with from 0.1 to 4 parts by weight of a polyalkylene oxide, which contains from 8 to 100 alkylene oxide units and in which the terminal OH groups have been replaced by chlorine, as the difunctional crosslinking agent.

The nitrogen-containing condensation products thus obtained do not contain any impurities which interfere with their use and are more active than the crosslinking agents disclosed in German Laid-Open Application DOS No. 2,434,816.

Polyamidoamines which are employed in the process according to the invention are obtained when dicarboxylic acids of 4 to 10 carbon atoms are reacted with polyalkylenepolyamines which contain 3–10 basic nitrogen atoms in the molecule. Examples of suitable dicarboxylic acids are succinic acid, maleic acid, adipic acid, glutaric acid, suberic acid, sebacic acid and terephthalic acid. Mixtures of dicarboxylic acids may also be used to prepare the polyamidoamines, eg. mixtures of adipic acid and glutaric acid, or of maleic acid and adipic acid. The use of adipic acid is preferred. The carboxylic acids are condensed with polyalkylenepolyamines which contain 3–10 basic nitrogen atoms in the molecule, eg. diethylenetriamine, triethylenetetramine, tetraethylenepentamine, dipropylenetriamine, tripropylenetetramine, dihexamethylenetriamine, aminopropylethylenediamine and bis-aminopropylethylenediamine. The polyalkylenepolyamines may be employed either in the pure form or as mixtures with one another and/or with up to 10% by weight of a diamine, eg. ethylenediamine or hexamethylenediamine. The reaction of the dicarboxylic acids with the polyalkylenepolyamines is preferably carried out in the absence of a solvent, but may also be carried out in a solvent which is inert toward these compounds. To effect the reaction, the reactants are heated at an elevated temperature, eg. at from 120° to 180° C., and the water of reaction is removed from the system. However, the condensation may also be carried out in the presence of lactones or lactams of carboxylic acids of 4 to 8 carbon atoms. Such compounds then become incorporated, as condensed units, into the polyamidoamine. From 0.8 to 1.4 moles of polyalkylenepolyamine are employed per mole of dicarboxylic acid.

The polyamidoamines can be reacted direct with the difunctional crosslinking agents to give nitrogen-containing condensates. However, particularly effective retention agents and drainage aids are obtained if, prior to the reaction with the difunctional crosslinking agents, the polyamidoamines are modified with from 2 to 8 ethyleneimine units per basic nitrogen (ie. 100 parts by weight of a polyamidoamine are reacted with from 20 to 400 parts by weight of ethyleneimine). Products of this nature are obtained by grafting ethyleneimine onto the polyamidoamine in the presence of an acid or Lewis acid, eg. boron trifluoride etherate or sulfuric acid. Compounds which generate an acid, such as dimethyl sulfate and alkyl halides, may also be used.

The difunctional crosslinking agents used according to the invention are α,ω-dihalopolyglycol ethers derived from polyglycol ethers containing 8–100 alkylene oxide units. Suitable polyalkylene oxides are, in the main, ethylene oxide homopolymers and ethylene oxide/propylene oxide copolymers, but the proportion of propylene oxide groups should advantageously be at most 50% of the total alkylene oxide groups. Preferably, block copolymers of the formula

are used, where $R^1$ is an ethylene radical, $R^2$ is a 1,2-propylene radical, m and p have values from 1 to 50, n has a value from 0 to 50 and A is the radical of a dihydric alcohol of 2 to 6 carbon atoms or of propylene glycol or of a polypropylene glycol containing 2–50 propylene oxide units, n in the latter case being 0. Specific examples are oxyethylated and oxyethylated/oxypropylated dihydric alcohols, e.g. glycol, propylene glycol or hexanediol, and polypropylene glycol containing up to 50 propylene oxide units per molecule. Oxyethylation of the latter product at both ends results in blocks of ethylene oxide units, i.e. block copolymers containing blocks of ethylene oxide, propylene oxide and ethylene oxide. The products obtained by oxyethylation, with or without oxypropylation, are to be regarded as compounds possessing two terminal free hydroxyl groups. These terminal hydroxyl groups are then replaced by chlorine, by 1. reaction with thionyl chloride, accompanied by elimination of HCl, followed by catalytic decomposition of the chlorosulfonated compound, with elimination of sulfur dioxide, or 2. conversion to the corresponding bis-chlorocarbonic acid ester by reaction with phosgene, accompanied by elimination of HCl, following by catalytic decomposition, with elimination of carbon dioxide. In each case α,ω-dichloro-polyglycol ethers are obtained. The decomposition of the bis-chlorosulfonated compounds obtained by the first stage of method 1 and of the bis-chlorocarbonic acid esters formed in the first stage of method 2, to give α,ω-dichloro-polyalkylene oxides, is carried out by conventional methods, namely heating these compounds at about 70°–150° C. in the presence of up to 2% by weight of a tertiary amine. Only these two methods are suitable for the preparation of the α,ω-dichloro-polyglycol ethers, since they give the required crosslinking agents in sufficient purity that they can be used directly for the preparation of the nitrogen-containing condensates without first having to be subjected to an expensive purification operation.

The polyamidoamines, which may or may not contain 2–8 grafted ethyleneimine units per basic nitrogen, are crosslinked with the α,ω-dichloropolyglycol ethers at above 20° C. The crosslinking is carried out in a solvent. Suitable solvents are water and organic fluids which are water-miscible, for example monohydric and polyhydric alcohols, provided these are completely water-miscible, dioxane, tetrahydrofuran and etherified polyols, eg. monoethers of ethylene glycol, diethylene glycol and triethylene glycol with $C_1$–$C_4$-alcohols, and the corresponding diethers, eg. diethylene glycol diethyl ether and diethylene glycol dibutyl ether. Of course, mixtures of several solvents may also be used. Preferably, the reaction is carried out in water.

The conjoint concentration of the polyamidoamine and of the difunctional crosslinking agent in the solvent can vary within a wide range and can be, for example, from 80 to 10% by weight. If water is used as the sole solvent, the condensation reaction is as a rule carried out under atmospheric pressure at up to 100° C. If the reaction is carried out in the absence of water or in the presence of only small amounts of water, and a solvent boiling below the condensation temperature is used, the condensation is carried out in a pressure apparatus.

A suitable procedure for preparing the water-soluble, nitrogen-containing condensates is to mix the polyamidoamines, which may or may not contain grafted ethyleneimine units, and the difunctional crosslinking agents, and heat the mixture at an elevated temperature in order to bring about the crosslinking reaction. An alternative procedure is to introduce a portion of the polyamidoamine into a reaction vessel, heat this to the condensation temperature, and add the crosslinking agent at the rate at which it is consumed. Yet again, it is possible to introduce the α,ω-dichloropolyglycol ethers, used as difunctional crosslinking agents, into the reaction vessel, heat them to the condensation temperature and add the polyamidoamine, continuously or in portions, in accordance with the rate of the reaction. Depending on the reaction conditions, namely the temperature, the concentration of the reactants, and the solvent, the condensation reaction is complete after from about 30 minutes to 15 hours. The condensation is taken at least to the point that water-soluble, high molecular weight resins which have a viscosity, measured in 20% strength aqueous solution at 20° C., of not less than 300 millipascal are obtained. Preferably, resins which have a viscosity of from 400 to 2,500 mPas in 20% strength aqueous solution at 20° C. are prepared. The course of the crosslinking reaction can easily be followed by taking samples of the reaction mixture and determining the viscosity of the resin solutions.

The condensation reaction is carried out at a pH above 8, preferably at from 9 to 11. It can easily be stopped by reducing the pH to 7 or less. The crosslinking agents described in German Laid-Open Application DOS No. 2,434,816 (α, ω -dichlorohydrin-polyalkylene glycol ethers) must, in the prior art process, be reacted completely since otherwise a further undesired increase in the viscosity of the condensates occurs. By contrast, it is not necessary, with the novel process, that the entire amount of the difunctional crosslinking agent (α,ω-dichloro-polyalkylene glycol) should be reacted with the polyamidoamine. Rather, storage-stable products are obtained even if residual unconverted α,ω-dichloropolyethylene glycol remains in the condensate, provided the pH of the aqueous solution of the reaction mixture is brought to 5 or less. The novel process has the advantage over the process disclosed in German Laid-Open Application DOS No. 2,434,816 that the crosslinking reaction is more easily controllable, especially with sizeable batches, in particular by lowering the temperature and by reducing the pH. The proportion of the cross-linking agent which has not reacted with the polyamidoamine can be left in the condensate without thereby causing an undesired side-reaction.

The nitrogen-containing condensates prepared as described are used as flocculating agents, retention agents and drainage aids in the manufacture of paper. If the condensation of the polyamidoamines with the difunctional crosslinking agents has been carried out in a water-miscible solvent, it is not necessary to remove this solvent; instead, the reaction mixture can be employed direct, or after dilution with water, in paper manufacture. The water-soluble, nitrogen-containing condensates are added to the stock in an amount of from 0.01 to 0.3% by weight, based on dry fiber.

In the Examples parts and percentages are by weight unless stated otherwise. The products prepared according to the invention were tested as drainage aids and compared, in respect of these properties, with conventional drainage aids. The drainage acceleration was characterized in terms of the reduction in freeness, in °SR. The Schopper-Riegler freeness was determined in accordance with the method of Leaflet 107 of the Verein der Zellstoff-und Papierchemiker und Ingenieure. All the viscosity data shown were determined on 20% strength by weight aqueous solutions at 20° C. in a Haake rotary viscometer, using a shearing rate of 49 sec$^{-1}$ in the viscosity range below 1,000 mPas and of 24.5 sec$^{-1}$ at viscosities above this.

The filler retention was characterized in terms of the ash content of paper sheets which were prepared by means of a Rapid-Köthen apparatus, in accordance with Leaflet 108 of the Verein der Zellstoff-und Papierchemiker und Ingenieure. The paper whiteness was determined by means of a Zeiss-Elrepho instrument, filter R46R with and without UV excitation. The reflectance is shown in percent.

Preparation of α,ω-dichloropolyglycol ethers

1. The reaction of polyethylene glycols with phosgene, and cleavage of the bis-chloroformates (a) 900 parts of gaseous phosgene are introduced into 1772 parts of polyethylene glycol of mean molecular weight 600 over 4 hours at 25°–35° C., with exclusion of moisture, and at a rate such that the phosgene refluxes. The reaction mixture is then kept at 60° C. for 1 hour, during which 200 parts of phosgene are introduced. Thereafter, the temperature is raised to 80° C. in the course of a further hour. To remove excess phosgene, a dry stream of nitrogen (50 liters/hour) is then passed through the reaction mixture. 2,166 parts of polyethylene glycol bis-chloroformate are obtained as a clear pale yellow liquid.

This product is decomposed, to give the α,ω-dichloro compound by, for example, dissolving 4 parts of pyridine in 200 parts thereof and heating the solution at 120°-125° C. At this temperature, carbon dioxide is rapidly eliminated. 2,000 parts of the bis-chloroformate are introduced dropwise over 3 hours. When the elimination of $CO_2$ has ceased, 1,966 g of α,ω-dichloro-polyglycol ether (mean molecular weight: 600) are obtained as a yellow to pale brown liquid. The yield is virtually quantitative and the difunctional crosslinking agent obtained is sufficiently pure to be used direct—without further purification—for the crosslinking of polyamidoamines. The chlorine content of the α,ω-dichloro-polyglycol ether is 11.3% (identical with the theoretical value).

α,ω-Dichloro-polyglycol ethers derived from polyethylene glycols of molecular weight
(b) 200
(c) 400
(d) 800
(e) 1,000 and
(f) 1,500
were prepared in a similar manner. These reactions again gave a virtually quantitative yield of α,ω-dichloro-polyglycol ether, so that removal of impurities was unnecessary.

2. Preparation of α,ω-dichloro-polyglycol ethers by reacting polyethylene glycols with thionyl chloride (a) 300 parts of a polyethylene glycol of mean molecular weight 1,500 is heated to 56° C., with exclusion of moisture, and 80.9 parts of thionyl chloride are added over 45 minutes, with thorough mixing. The terminal OH groups of the polyethylene glycol react with the thionyl chloride, HCl being evolved. When all the thionyl chloride has been added, the reaction mixture is stirred for 18 hours at 40° C., after which nitrogen is passed through the melt for 4 hours to remove the hydrochloric acid virtually completely from the reaction product. In order to convert the chlorosulfonated polyethylene glycol ether, thus obtained, to the corresponding α,ω-dichloro compound, 4 parts of pyridine are added to the chlorosulfonation product and the mixture is heated at 120°-130° C. Sulfur dioxide is eliminated, and after its evolution has ceased the reaction mixture is kept at 120° C. for a further 2 hours, and finally the residual sulfur dioxide is removed at this temperature under reduced pressure from a waterpump. On cooling the batch to room temperature, a pale yellow paste is obtained, which consists of the desired α,ω-dichloropolyglycol ether (chlorine content of the reaction product 4.7%; theoretical value 4.62%).

The α,ω-dichloro compounds of polyethylene glycols of mean molecular weight
(b) 4,000
(c) 6,000
(d) 9,000
and the α,ω-dichloro compounds of
(e) polytetrahydrofuran of mean molecular weight 600 and
(f) polypropylene glycol of mean molecular weight 800 were prepared in a similar manner. The difunctional crosslinking agents obtained from (b)–(f) were also sufficiently pure to be used direct for the preparation of crosslinked, water-soluble, nitrogen-containing condensates. Preparation of the polyamidoamine resin 1.

A mixture of 530 parts of water, 667 parts of a mixture of 91.5% of diethylenetriamine and 8.5% of triethylenetetramine, and 925 parts of adipic acid is heated to 160° C. in the course of 3½ hours under nitrogen. Water is then distilled off at 160° C. for 5 hours. 1,400 parts of water are added to the resulting polyamidoamine whilst it is at 130° C., giving a 48.3% strength aqueous solution. This resin solution has a density of 1.095 g/cm³ and a viscosity of 320 mPas at 25° C. It contains 7.0% (based on 100% pure polyamidoamine) of basic nitrogen. Preparation of the polyamidoamine resin 2

15.5 parts of concentrated sulfuric acid are added to 548.6 parts of a 48.3% strength aqueous solution of polyamidoamine resin 1 (which solution accordingly contains 250 parts of the 100% pure resin 1), and the mixture is heated to 80° C. 534 parts of a 50% strength aqueous ethyleneimine solution are then added over 4 hours at 80°-85° C. After this addition, the reaction mixture is kept at 80° C. for a further 30 minutes. A polyamidoamine modified with 6.2 ethyleneimine units per basic nitrogen is obtained in the form of a 47.1% strength aqueous solution which at 20° C. has a density of 1.094 g/cm³ and a viscosity of 753 mPas. Preparation of the polyamidoamine resin 3

581 parts of adipic acid are added to 507 parts of an amine mixture of 9% by weight of ethylenediamine, 49% by weight of γ-aminopropyl-ethylenediamine, 39% by weight of bis-(γ-aminopropyl-ethylenediamine and 3% by weight of higher polyalkylenepolyamines in 250 parts of water at 60°-80°, under nitrogen. The mixture is kept at 120° for 2 hours, whilst distilling off the water, and the temperature of the residue is then raised to 160°-170° over 3 hours and kept at this level until the acid number has fallen to below 15 mg of KOH/g. 1,000 parts of water are rapidly added to the viscous resin at 130° C. and the mixture is cooled to room temperature.

The aqueous pale brown resin solution has the following characteristics:

| | |
|---|---|
| Solids content: | 50.4% by weight |
| Acid number: ⎫ based on 100% | 0.279 milliequivalent/g |
| Amine number: ⎬ pure product | 4.82 milliequivalents/g |
| Viscosity of a 45% strength aqueous resin solution at 20° C.: | 567 mPas |
| Refractive index of a 45% strength resin solution, $n_D^{20}$: | 1.4242. |

Preparation of the polyamidoamine resin 4

3.75 parts of 98% strength sulfuric acid are added to 500 parts of the aqueous solution, of about 50% strength, of the polyamidoamine resin 3 and the mixture is heated to 70° C. 540 parts of a 50% strength aqueous ethyleneimine solution are run into this solution over about 3 hours, at about 80° C. After all the ethyleneimine has been added, the reaction mixture is kept at 80° C. for 1-2 hours, until ethyleneimine is no longer detectable in the reaction solution. The resin has the following characteristics:

Solids content: 47.8% by weight
Acid number: 0.11 milliequivalent/g
Amine number: 10.27 milliequivalents/g
Viscosity (of a 45% strength solution): 614 mPas (at 20° C.)

EXAMPLE 1

212.3 parts of the 47.1% strength aqueous solution of polyamidoamine resin 2 were diluted to 25% strength and 116 parts of a 25% strength solution (equivalent to 29 parts of solid material) of the $\alpha,\omega$-dichloro-polyethylene glycol ether obtained by reacting a polyethylene glycol having a molecular weight of 1,500 with phosgene followed by cleavage of the bischloroformates (as previously described) were added at 85° C. This means that, expressed in terms of the pure materials, 0.29 part of crosslinking agent was used per part of polyamidoamine. The crosslinking reaction was complete after 5.8 hours at 85° C. The reaction was stopped by adding 28 parts of formic acid, whereby the pH of the reaction mixture was reduced to 7.5. The mixture was then diluted to an active substance content of 20% by adding water. The viscosity of this diluted mixture was 800 mPas.

EXAMPLE 2

31 parts of a 25% strength aqueous solution of the $\alpha,\omega$-dichloro-polyglycol ether 1(f) were added to 100 parts of a 25% strength aqueous solution of polyamidoamine resin 2 and the mixture was heated to 85° C., with thorough mixing. The viscosity of the reaction mixture was monitored by taking samples at intervals of 10 minutes, preparing 20% strength aqueous solutions of these and determining the viscosity at 20° C. After condensing the mixture for 5.2 hours at 85°–90° C., the viscosity of a sample of the reaction mixture in 20% strength aqueous solution at 20° C. was 800 mPas. The pH of the solution was reduced to 8 by adding formic acid. The reaction mixture was cooled to room temperature and diluted to an active substance content of 20% by adding water.

COMPARATIVE EXAMPLE 1

The procedure described in Example 1 was followed except that the difunctional crosslinking agent used was the $\alpha,\omega$-di-(propylene chlorohydrin)-polyethylene glycol ether obtained by reacting 1 mole of polyethylene glycol of molecular weight 1,500 with 2.05 moles of epichlorohydrin, in accordance with German Laid-Open Application DOS No. 2,434,816. The crosslinking temperature was 65° C. This means that 0.23 part of 100% pure di-(propylene chlorohydrin)-polyethylene glycol ether was employed per part by weight of the 100% pure polyamidoamine. After condensing the reaction mixture for 4.5 hours, the pH was brought to 8 by adding formic acid and the solution was diluted to a 20% content of active substance. The viscosity of this 20% strength aqueous solution was 420 mPas at 20° C.

EXAMPLE 3

207 parts of the 48.3% strength aqueous solution of polyamidoamine resin 1 were diluted to a 25% strength aqueous solution, which was heated to 85° C.; at this temperature, a 25% strength aqueous solution of the $\alpha,\omega$-dichloro-polyethylene glycol ether 2(a) was added slowly. The addition was continued until the viscosity of a 20% strength aqueous solution at 20° C. was 800 mPas. This required 38.5 parts of the difunctional crosslinking agent 2(a), calculated as 100% strength active substance, namely 154 parts of the 25% strength aqueous solution. Accordingly, 0.385 part of 100% pure $\alpha,\omega$-dichloro compound was employed per part of 100% pure polyamidoamine. When the desired viscosity had been reached, the condensation was stopped by adding formic acid; a pH of 8 was found to be sufficiently low for this purpose. The reaction mixture was then diluted to an active substance content of 20%.

COMPARATIVE EXAMPLE 2

The procedure described in Example 3 was followed, except that the difunctional crosslinking agent used was the di-(propylene chlorohydrin) of polyethylene glycol ether having a molecular weight of 1,500 (crosslinking agent according to German Laid-Open Application DOS No. 2,434,816). The crosslinking temperature was 65° C. 42.5 parts by weight of the 100% pure crosslinking agent were required per 100 parts by weight of pure polyamidoamine to give a viscosity of 800 mPas, measured on a 20% strength aqueous solution of the crosslinked polyamidoamine, at 20° C. The pH of the resin solution was brought to 8 by adding formic acid, and the mixture was then diluted to an active substance content of 20%.

EXAMPLE 4

603.2 parts of the 47.75% strength polyamidoamine resin 4 were diluted with 596.8 parts of water and the mixture was heated to 90° C. For crosslinking, 330 parts of a 20% strength aqueous solution of a polyetherdichloride (crosslinking agent 1f) obtained by phosgenating a polyethylene glycol of molecular weight 1,500 were added. The 100% pure crosslinking agent had the following characteristics:
Chloride content: 0.023 milliequivalent/g
Total chlorine: 1.38 milliequivalents/g
Volatiles: 0.3%

After $2\frac{3}{4}$ hours, the viscosity of the resin showed no further rise; a further 28 parts of cross-linking agent solution 1(f) were then added. In the course of a further $3\frac{1}{2}$ hours, the viscosity of the resin rose to 1,719 mPas, measured at 20° C. The resin was cooled to room temperature, brought to a pH of 9.0 with 71.5 parts of 85% strength formic acid, and diluted with water to an active substance content of 20%. This resin solution had a viscosity of 1,043 mPas, measured on a Haake rotary viscometer at 20° C.

EXAMPLE 5

603.2 parts of the 47.75% strength polyamidoamine resin 4 were diluted with 596.8 parts of water and 462 parts of a 20% strength aqueous solution of the polyether-dichloride 1(f) were added at 90° C. The reaction mixture was kept at the same temperature until the resin solution had reached a viscosity of 1,500 mPas, measured at 20° C.; this required 170 minutes. The reaction was then stopped by neutralizing to pH 7 with formic acid, and the mixture was cooled to room temperature. It was stabilized by acidifying to pH 4.0 with 85% strength formic acid, the total amount required being 199 parts. When diluted with water to 20% content of active substance the resin solution had a viscosity of 1,105 mPas at 20° C.

COMPARATIVE EXAMPLE 3

337 parts of the 47.8% strength aqueous polyamidoamine resin solution 4 were diluted to 24% active substance content with 334 parts of water; the mixture was heated to 70° C. and 192 parts of a 24% strength aqueous crosslinking agent solution were added. The crosslinking agent used was a reaction product prepared from 1 mole of polyethylene glycol of mean molecular weight 1,500 and 2.05 moles of epichlorohydrin, in the presence of boron trifluoride. The condensation at 70° C. was continued until no further increase in viscosity of the reaction mixture was detectable; a further 3 portions (48,14 and 8 parts respectively) of the 24% strength crosslinking agent solution were then added, to produce further crosslinking, until the viscosity of the resin ultimately reached 1,530 mPas at 20° C. The resin was then brought to pH 8.0 with 85% strength formic acid and was diluted with water to 20% content of active substance. This 20% strength aqueous resin solution had a viscosity of 675 mPas at 20° C.

Use of the resins prepared in Examples 1 to 5 and Comparative Examples 1 to 3

First, the drainage acceleration was tested. The stock used was newsprint, which was pulped in an Ultraturrax apparatus until speck-free. Two different pH values, and various amounts of materials, were used. The stock consistency was 0.24 g/l. The results obtained are summarized in Table 1.

TABLE 1

| | Drainage acceleration | | | | Effect on paper whiteness and on the efficiency of optical brighteners | |
|---|---|---|---|---|---|---|
| | pH 7.3 | | pH 4.8 (1.5% of alum added to the stock) | | | |
| 100% pure resin added (% based on dry pulp) | 0.06 | 0.08 | 0.05 | 0.09 | with UV 88.7% | without UV 84.2% |
| | °SR | | | | | |
| Blank value (without added resin) | 76 | | 70 | | | |
| Resin from Comparative Example 1 | 52 | 50 | 40 | 36 | 81.5% | 78.5% |
| Example 1 | 50 | 48 | 38 | 35 | 81.8% | 78.8% |
| Example 2 | 50 | 48.5 | 38.5 | 35 | 81.9% | 78.9% |

The filler retention for different amounts of resin added to the stock was also determined. The results are summarized in Table 2.

TABLE 2

| pH of the fiber suspension: | | 6 | 4.8 |
|---|---|---|---|
| | | Filler retention (% ash in the paper) | |
| Alum added, based on pulp plus filler | | 0.5 | 1.5 |
| Blank value | | 2.2 | 2.4 |
| Comparative Example 1 | 0.015% added | 4.9 | 5.0 |
| | 0.03% added | 7.0 | 6.3 |
| Example 1 | 0.015% added | 5.3 | 5.1 |
| | 0.03% added | 6.7 | 5.9 |
| Example 2 | 0.015% added | 5.5 | 5.0 |
| | 0.03% added | 6.8 | 6.0 |

To test the drainage acceleration produced by the resin from Example 3 and from Comparative Example 2, newsprint was pulped in an Ultraturrax apparatus until speck-free. The stock consistency was 0.24 g/l. The following values were found.

TABLE 3

| | pH 7.3 | | pH 4.8 (1.5% of alum added to the stock) | |
|---|---|---|---|---|
| 100% pure resin added, % based on dry pulp | 0.06 | 0.08 | 0.06 | 0.09 |

TABLE 3-continued

| | pH 7.3 | | pH 4.8 (1.5% of alum added to the stock) | |
|---|---|---|---|---|
| Blank value (without added resin) | 76.5 | | 68 | |
| Comparative Example 2 | 69 | 58 | 52 | 49 |
| Example 3 | 67 | 56 | 50 | 45 |

In testing the filler retention, the values shown in Table 4 were obtained.

TABLE 4

| pH of the fiber suspension | | 6 | 4.8 | |
|---|---|---|---|---|
| Alum added, based on pulp plus filler | | 0.5 | 1.5% | |
| Blank value | | 2.1 | 2.4 | |
| Comparative Example 1 | 0.015% added | 4.1 | 5.5 | % ash in the paper |
| | 0.03% added | 6.3 | 6.5 | |
| Example 3 | 0.015% added | 4.6 | 5.6 | |
| | 0.03% added | 6.5 | 6.5 | |

The effect of the resins on the paper whiteness was found to be as follows:

TABLE 5

| | Sample from Comparative Example 2 | Sample from Example 3 |
|---|---|---|
| With UV 95.8% | 90.6% | 90.0% |
| Without UV 88.9% | 88.8% | 88.7% |

The drainage acceleration produced by the resins from Examples 4 and 5 and from Comparative Example 3 was tested by adding the resins to a stock of newsprint, which had been pulped until speck-free, at a stock consistency of 0.24 g/liter and a neutral or slightly acid pH. The following results were obtained:

TABLE 6

| | Drainage acceleration | | | | | |
|---|---|---|---|---|---|---|
| | Neutral | | | pH 4.8 (4.5% of alum added to the stock) | | |
| 100% pure resin added (% based on dry pulp) | 0.06 | 0.08 | 0.12 | 0.03 | 0.06 | 0.09 |
| | °SR | | | °SR | | |
| Blank value (without added resin) | 63 | | | 58.5 | | |
| Comparative Example 3 | 42 | 37 | 33 | 47.5 | 45.5 | 43 |
| Example 4 | 40 | 37 | 33 | 44.5 | 41.5 | 40 |
| Example 5 | 41 | 38 | 34 | 46 | 44 | 42.5 |

The filler retention was determined by measuring the ash content of paper sheets which had been produced, in the presence of the resins, on a Rapid-Köthen apparatus (Leaflet 108 of the Verein der Zellstoff-und Papierchemiker und-Ingenieure). The following values were found:

TABLE 7

Stock: 80% bleached sulfite cellulose (35 °SR) plus 20% of China clay
Stock consistency: 2 g/liter

| | pH 6; 0.4% of alum | | | pH 4.5; 1.4% of alum | | |
|---|---|---|---|---|---|---|
| 100% pure resin added (% based on dry pulp) | 0.015 | 0.030 | 0.045 | 0.015 | 0.030 | 0.045 |
| | % ash | | | | | |
| Blank value (without added resin) | 4.0 | | | 2.9 | | |
| Comparative Example 3 | 8.2 | 8.8 | 9.2 | 6.6 | 7.2 | 7.8 |
| Example 4 | 7.8 | 8.8 | 9.1 | 6.7 | 7.9 | 8.3 |

TABLE 7-continued

| Example 5 | 7.8 | 8.9 | 9.2 | 6.6 | 7.1 | 7.8 |

We claim:

1. An improved process for the preparation of a water-soluble papermaking auxiliary, to be used as a drainage aid, flocculant, or retention aid, comprising reacting
   (a) 1 part by weight of a polyamidoamine, obtained by condensing 1 mole of a dicarboxylic acid of 4 to 10 carbon atoms with 0.8–1.4 moles of a polyalkylenepolyamine having 3–10 alkyleneimine units to give a primary product followed by grafting from 2 to 8 ethyleneimine units per basic nitrogen of the primary product onto the primary product in the presence of a catalyst selected from the group consisting of acids, Lewis acids, and compounds which generate an acid during said grafting, with
   (b) 0.1–4 parts by weight of a crosslinking agent at above 20° C. in aqueous solution or in a water-soluble organic solvent to give said auxiliary, the reaction being continued until the viscosity of an aqueous solution containing 20% by weight of the auxiliary is from 300 to 2,500 milliPascal seconds,
      wherein the crosslinking agent is an $\alpha,\omega$-dichloropolyalkylene oxide obtained by reacting a polyalkylene oxide containing 8–100 alkylene oxide units with a compound selected from the group consisting of thionyl chloride and phosgene to give a reaction product and then cleaving the reaction product by heating the reaction product at from 70° to 150° C. in the presence of a tertiary amine catalyst.

2. A water-soluble papermaking auxiliary prepared by reacting
   (a) 1 part by weight of a polyamidoamine, obtained by condensing 1 mole of a dicarboxylic acid of 4 to 10 carbon atoms with 0.8–1.4 moles of a polyalkylenepolyamine having from 3 to 10 alkyleneimine units to give a primary product followed by grafting from 2 to 8 ethyleneimine units per basic nitrogen of the primary product onto the primary product, with
   (b) 0.1–4 parts by weight of an $\alpha,\omega$-dichloropolyalkylene oxide, obtained by reacting a polyalkylene oxide containing 8–100 alkylene oxide units with a compound selected from the group consisting of thionyl chloride and phosgene to give a reaction product and then cleaving the reaction product by heating the reaction product at from 70° to 150° C. in the presence of a tertiary amine catalyst,
   at above 20° C. in aqueous solution or in a water-soluble organic solvent until the viscosity of an aqueous solution containing 20% by weight of the auxiliary is from 300 to 2,500 milliPascal seconds.

* * * * *